(12) United States Patent
Hong

(10) Patent No.: US 11,825,552 B2
(45) Date of Patent: Nov. 21, 2023

(54) INFORMATION TRANSMISSION METHOD, DEVICE AND SYSTEM, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 449 days.

(21) Appl. No.: 17/118,396

(22) Filed: Dec. 10, 2020

(65) Prior Publication Data

US 2021/0092590 A1    Mar. 25, 2021

Related U.S. Application Data

(63) Continuation of application No. PCT/CN2018/091249, filed on Jun. 14, 2018.

(51) Int. Cl.
| | |
|---|---|
| *H04W 8/24* | (2009.01) |
| *H04W 76/10* | (2018.01) |
| *B64C 39/02* | (2023.01) |
| *B64U 10/13* | (2023.01) |
| *B64U 101/00* | (2023.01) |

(52) U.S. Cl.
CPC ............. *H04W 8/24* (2013.01); *B64C 39/024* (2013.01); *H04W 76/10* (2018.02); *B64U 10/13* (2023.01); *B64U 2101/00* (2023.01)

(58) Field of Classification Search
CPC ....... H04W 76/10; H04W 60/04; H04W 8/24; B64C 39/024; B64U 2201/00; B64U 10/13; B64U 2101/00
See application file for complete search history.

(56) References Cited

U.S. PATENT DOCUMENTS

| | | | |
|---|---|---|---|
| 6,580,906 B2 | 6/2003 | Bilgic et al. | |
| 9,537,561 B1 * | 1/2017 | Kotecha | ................ H04W 8/00 |
| 9,977,434 B2 | 5/2018 | Mellinger, III | |
| 2016/0330771 A1 | 11/2016 | Tan | |
| 2017/0124884 A1 | 5/2017 | Shaw et al. | |
| 2017/0331827 A1 | 11/2017 | Salyers et al. | |

(Continued)

FOREIGN PATENT DOCUMENTS

| | | |
|---|---|---|
| CN | 102905265 A | 1/2013 |
| CN | 105739520 A | 7/2016 |

(Continued)

OTHER PUBLICATIONS

Huawei, HiSilicon, "Identification of Air-borne UE", 3GPP TSG-RAN WG2 Meeting #99 R2-1708543, Berlin, Germany, Aug. 21-25, 2017, (3 pages).

(Continued)

*Primary Examiner* — Congvan Tran
(74) *Attorney, Agent, or Firm* — Arch & Lake LLP

(57) ABSTRACT

The present disclosure relates to an information transmission method, device and system, and a storage medium. The method comprises: an unmanned aerial vehicle (UAV) sends type information to a mobility management entity (MME); and the MME receives the type information sent by the unmanned aerial vehicle, wherein the type information is used for indicating the type of the unmanned aerial vehicle.

10 Claims, 4 Drawing Sheets

(56) References Cited

U.S. PATENT DOCUMENTS

| | | | |
|---|---|---|---|
| 2017/0371353 | A1 | 12/2017 | Mellinger, III |
| 2018/0253092 | A1 | 9/2018 | Trapero Esteban |
| 2019/0082320 | A1* | 3/2019 | Avasarala ............ H04L 63/0876 |
| 2019/0364507 | A1* | 11/2019 | De Rosa ............... B64C 39/024 |
| 2020/0162149 | A1* | 5/2020 | Poscher .............. H04L 61/4511 |
| 2020/0205211 | A1 | 6/2020 | Hong |
| 2020/0221280 | A1 | 7/2020 | Hong |
| 2021/0368557 | A1 | 11/2021 | Hong |

FOREIGN PATENT DOCUMENTS

| | | |
|---|---|---|
| CN | 105761550 A | 7/2016 |
| CN | 107409051 A | 11/2017 |
| CN | 107615785 A | 1/2018 |
| CN | 107786970 A | 3/2018 |
| CN | 108076433 A | 5/2018 |
| CN | 108352122 A | 7/2018 |
| GB | 2473717 B | 9/2013 |
| WO | 2017042403 A1 | 3/2017 |
| WO | 2018044365 A2 | 3/2018 |

OTHER PUBLICATIONS

ETRI, "UE Identity Check Procedure", 3GPP TSG SA WG2 Meeting #60 TD S2-074181, Kobe, Japan Oct. 8-12, 2007, (2 pages).

GSMA, "Liaison Statement on defining common value for SPID for Unmanned Aircraft", 3GPP SA WG2 Meeting #S2-124 S2-178308, Nov. 27-Dec. 1, 2017, Reno, Nevada, USA, (3 pages).

Supplementary European Search Report in the European application No. 18922935.4, dated Dec. 15, 2021, (10 pages).

Wang Baochang, "Vocational Education "Thirteenth Five-Year Plan" Teaching Materials UAV Aerial Photography Technology UAV Application Technology", Northwestern Polytechnical University Press, Jan. 2017, p. 139-145, (18 pages).

Second Office Action of the Chinese application No. 201880000660. 6, dated Jun. 24, 2021, (20 pages).

First Office Action of the Indian Application No. 202147001407, dated May 24, 2021, (5p).

International Search Report and Written Opinion issued in the International Application No. PCT/CN2018/091249, dated Feb. 14, 2019 with English translation, (10p).

Chen Qi 'an et al., Technology Fundamentals of Cyberspace Security, pp. 332-333, Xiamen University Press, Dec. 2017. 15 pages with English translation, (15p).

3GPP TSG-RAN2#98 R2-1704335, Apr. 15-19, 2017, Hangzhou, P.R. China, Source: NTT DOCOMO, Inc. Title: Aerial Vehicle UE identification, Document for: Discussion and Approval, Agenda Item: 9.4.5, 2 pages.

Wu Chenglin et al., Research on the construction scheme of 4G mobile core network under the background of heavy traffic, Telecommunications Technology, May 2018. 5 pages with English translation, (5p).

3GPP TSG-RAN WG2 #101bis Tdoc R2-1806347, Sanya, China, Apr. 16-20, 2018, Agenda Item: 9.18.1, Source: Ericsson, Title: Proposal to progress LTE_Aerial-Core, Document for: Discussion, Decision, (9p).

Notice of Allowance of the Chinese application No. 201880000660. 6, dated Jun. 27, 2022. 8 pages with English translation, (8p).

* cited by examiner

INFORMATION TRANSMISSION METHOD, DEVICE AND SYSTEM, AND STORAGE MEDIUM

CROSS-REFERENCE TO RELATED APPLICATION

This application is a continuation of PCT Application PCT/CN2018/091249, filed on Jun. 14, 2018, the entire contents of which are incorporated herein by reference for all purpose.

TECHNICAL FIELD

The present disclosure generally relates to the technical field of wireless communication, and more particularly, to an information transmission method, device and system and a storage medium.

BACKGROUND

An unmanned aerial vehicle is referred to as UAV, which is an unmanned aerial vehicle operable by a radio remote control device. At present, it is increasingly common in people's daily lives to attach a UAV to a cellular network to control the UAV through the cellular network. How to improve flexibility of a cellular network in controlling a UAV has become a problem urgent to be solved.

SUMMARY

Embodiments of the present disclosure provide an information transmission method, device and system and a storage medium, which may improve flexibility of a cellular network in controlling a UAV.

According to a first aspect of the present disclosure, an information transmission method is provided. The method includes sending, by a UAV, type information to a mobility management entity (MME). The type information indicates a type of the UAV.

According to a second aspect of the present disclosure, an information transmission device is provided. The method includes: receiving, by an MME, type information sent by a UAV. The type information indicates a type of the UAV.

According to a third aspect of the present disclosure, a UAV is provided. The UAV includes: a processor; and a memory configured to store an instruction executable by the processor. The processor is configured to send type information to an MME. The type information indicates a type of the UAV.

According to a fourth aspect of the present disclosure, an MME is provided. The MME includes: a processor; and a memory configured to store an instruction executable by the processor. The processor is configured to: receive type information sent by a UAV. The type information indicates a type of the UAV.

According to a fifth aspect of the present disclosure, a non-transitory computer readable storage medium is provided. The non-transitory computer readable storage medium stores a plurality of programs for execution by a UAV having one or more processors. The plurality of programs, when executed by the one or more processors, cause the UAV to perform acts comprising: sending type information to an MME. The type information indicates a type of the UAV.

According to a sixth aspect of the present disclosure, a non-transitory computer readable storage medium is provided. The non-transitory computer readable storage medium stores a plurality of programs for execution by an MME having one or more processors. The plurality of programs, when executed by the one or more processors, cause the MME to perform acts comprising: receiving type information sent by a UAV. The type information indicates a type of the UAV.

The technical solutions provided in the embodiments of the present disclosure may at least have the following beneficial effects.

The UAV sends the type information used for indicating the type of the UAV to the MME, and then the MME may control the UAV according to the type of the UAV, thereby improving the flexibility of controlling the UAV.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

For making the purposes, technical solutions and advantages of the present disclosure clearer, implementations of the present disclosure will further be described below in combination with the accompanying drawings in detail.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

A UAV is an unmanned aerial vehicle operable by a radio remote control device. At present, it is increasingly common in people's daily lives to attach a UAV to a cellular network to control the UAV through the cellular network.

During a practical application, there may be many types of UAVs. For example, types of UAVs may include such as a micro UAV, a light UAV, a small UAV, a medium-sized UAV and a large UAV. Since different types of UAVs threaten the public security to different extents when flying, different supervision requirements are introduced to different types of UAVs in many countries and districts throughout the world. For example, in China, the national air traffic control committee office organizes and drafts the Provisional Regulations for Flight Management of UAVs (Exposure Draft). In the Regulations, different supervision requirements are made on micro UAVs, light UAVs, small UAVs, medium-sized UAVs and large UAVs respectively. For example, it is specified in the Regulations that, for a micro UAV, a flight height may not exceed 50 meters and application for a flight plan is not required before a flight, and for a light UAV, a flight height may not exceed 200 meters and dynamic flight information is required to be reported in real time during a flight.

For improving the flexibility of a cellular network in controlling a UAV, the embodiments of the present disclosure provide an information transmission method. In the information transmission method, a UAV may send type information to an MME in a cellular network, and the type information is configured to indicate a type of the UAV. In this way, the MME may determine a supervision requirement on the UAV according to the type of the UAV and control the UAV according to the supervision requirement, so that the flexibility of controlling the UAV can be improved.

An implementation environment involved in the information transmission method provided in the embodiments of the present disclosure will be briefly described below.

Figure 1:
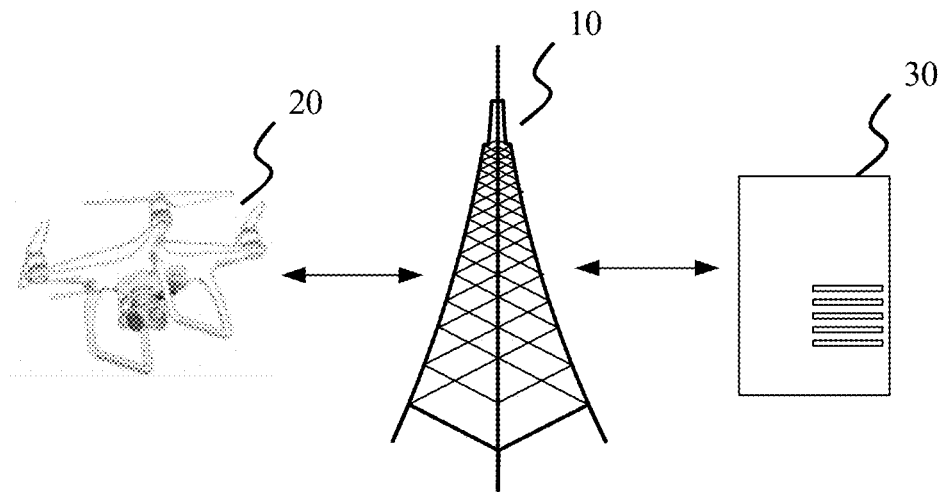
FIG. 1 is a schematic diagram illustrating an implementation environment according to an embodiment.

FIG. 1 is a schematic diagram illustrating an implementation environment involved in an information transmission method according to an embodiment of the present disclosure. As shown in FIG. 1, the implementation environment may include a base station 10, a UAV 20 and an MME 30. The base station 10 may be connected with the UAV 20 through a cellular network. The UAV 20 is any UAV in a cell served by the base station 10. The base station 10 may communicate with the MME 30 in a wired or wireless manner.

The cellular network between the base station 10 and the UAV 20 may be a Fifth Generation Mobile Communication Technology (5G) network, and may also be a Long Term Evolution (LTE) network or another cellular network similar to the LTE network or the 5G network.

Figure 2:
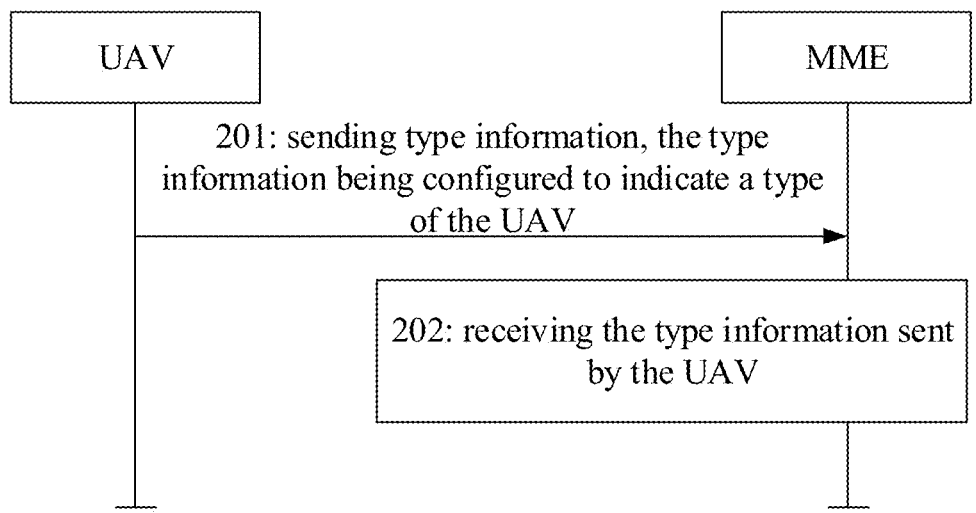
FIG. 2 is a flow chart illustrating an information transmission method according to an embodiment.

FIG. 2 is a flow chart illustrating an information transmission method according to an embodiment. As shown in FIG. 2, the information transmission method is applied to the implementation environment shown in FIG. 1. The information transmission method includes the following operations.

In 201, a UAV sends type information to an MME, the type information being used for indicating a type of the UAV.

In 202, the MME receives the type information sent by the UAV.

According to the information transmission method provided in the embodiment of the present disclosure, the UAV sends the type information used for indicating the type of the UAV to the MME, and then the MME can control the UAV according to the type of the UAV, thereby improving the flexibility of controlling the UAV.

Figure 3:
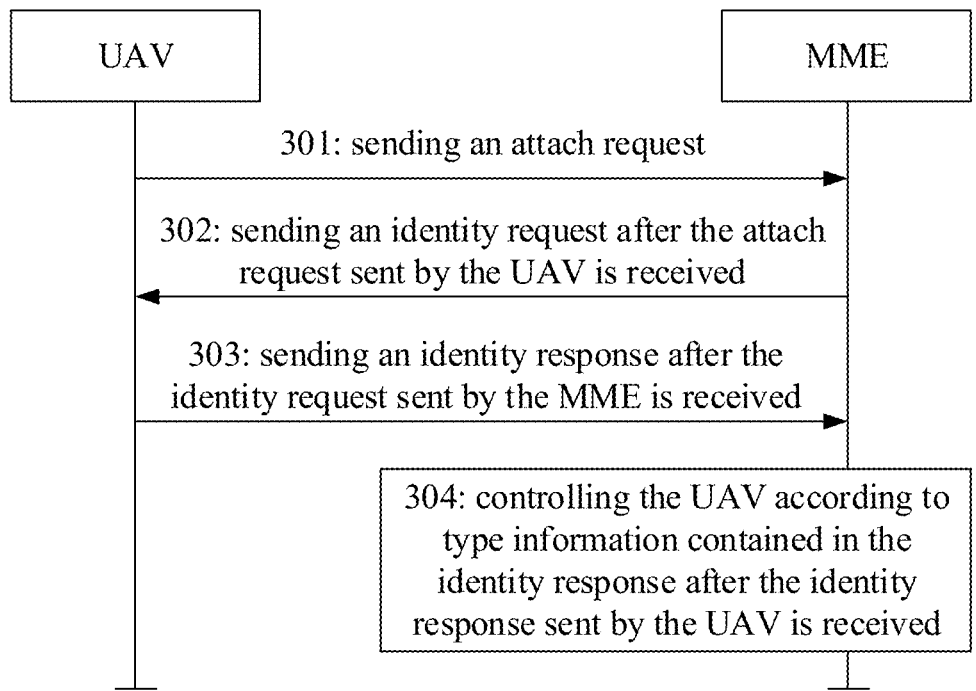
FIG. 3 is a flow chart illustrating an information transmission method according to an embodiment.

FIG. 3 is a flow chart illustrating an information transmission method according to an embodiment. As shown in FIG. 3, the information transmission method is applied to the implementation environment shown in FIG. 1. The information transmission method includes the following operations.

In 301, a UAV sends an attach request to an MME.

In a cellular network, the UAV may usually implement network attachment under the following three conditions.

First: the UAV implements network attachment after turned on.

Second: the UAV implements network attachment after returning to a coverage area of the cellular network from a coverage hole of the cellular network.

Third: the UAV implements network attachment after plugged with a Subscriber Identification Module (SIM) card.

The UAV may access the cellular network through a network attachment process, such that the cellular network can control the UAV.

The UAV may send an attach request to the MME through a base station in a network attachment process. The network attachment process may start from the step of sending the attach request to the MME through the base station. The network attachment process may include all steps until the cellular network that the MME is in can control the UAV.

In 302, the MME, after receiving an attach request sent by the UAV, sends an identity request to the UAV.

The MME, after receiving the attach request sent by the UAV, may send the identity request to the UAV through the base station. The identity request may instruct the UAV to report an IMEI of the UAV to the MME.

In 303, the UAV, after receiving the identity request sent by the MME, sends an identity response to the MME.

The UAV, after receiving the identity request sent by the MME, may send the identity response to the MME. The identity response may contain the IMEI of the UAV, and the IMEI is the "type information".

The IMEI is an identification code written in hardware of the UAV before shipment of the UAV and configured to uniquely identify the UAV. The IMEI may include a TAC consisting of 6 digits or 8 digits, and the TAC is configured to indicate a type of the UAV.

Taking the condition that UAV types include such as a micro UAV, a light UAV, a small UAV, a medium-sized UAV and a large UAV as an example, correspondence between a TAC and an indicated UAV type may be shown in Table 1.

TABLE 1

| TAC | UAV type |
| --- | --- |
| TAC1 | Micro UAV |
| TAC2 | Light UAV |
| TAC3 | Small UAV |
| TAC4 | Medium-sized UAV |
| TAC5 | Large UAV |

As shown in Table 1, when the UAV is a micro UAV, the TAC in the IMEI of the UAV is TAC1. Of course, Table 1 is only exemplary and not intended to limit the present disclosure.

During practical implementation, TACs used for indicating different UAV types may be specified and allocated by some organizations. No specific limits are made thereto in the embodiment of the present disclosure.

In 304, the MME, after receiving the identity response sent by the UAV, controls the UAV according to the type information contained in the identity response.

The MME, after receiving the identity response sent by the UAV, may extract the IMEI (i.e., the type information) of the UAV from the identity response and determine the type of the UAV according to the TAC in the IMEI of the UAV. Then, the MME may acquire a supervision requirement corresponding to the type of the UAV and control the UAV according to the supervision requirement. For example, for a light UAV, when a flight height thereof exceeds 200 meters, the MME may alarm or the MME may control the light UAV through the base station to decrease the flight height, etc.

From the above, according to the information transmission method provided in the embodiment of the present disclosure, the UAV sends the type information used for indicating the type of the UAV to the MME, and then the MME may control the UAV according to the type of the UAV, so that the flexibility of controlling the UAV can be improved.

Figure 4:
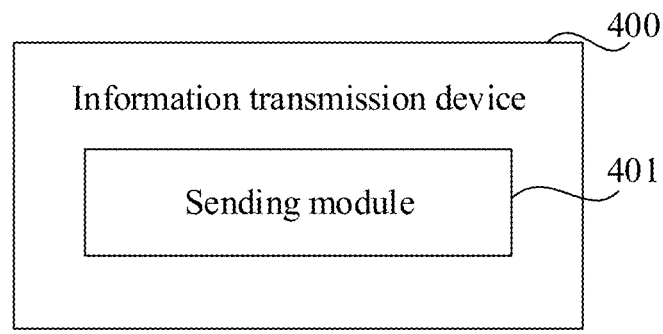
FIG. 4 is a block diagram of an information transmission device according to an embodiment.

FIG. 4 is a block diagram of an information transmission device 400 according to an embodiment. The information transmission device 400 may be arranged in the UAV 20 shown in FIG. 1. Referring to FIG. 4, the information transmission device 400 includes a sending module 401.

The sending module 401 is configured to send type information to an MME. The type information is configured to indicate a type of the UAV.

In an embodiment of the present disclosure, the type information is an IMEI of the UAV, and the IMEI includes a TAC configured to indicate the type of the UAV.

In an embodiment of the present disclosure, the sending module 401 is configured to send the type information to the MME in a network attachment process.

In an embodiment of the present disclosure, the sending module 401 is configured to, in the network attachment process, send the type information to the MME through an identity response after an identity request sent by the MME is received.

From the above, according to the information transmission device provided in the embodiment of the present disclosure, the type information used for indicating the type of the UAV is sent to the MME, to enable the MME to control the UAV according to the type of the UAV, thereby improving the flexibility of controlling the UAV.

Figure 5:
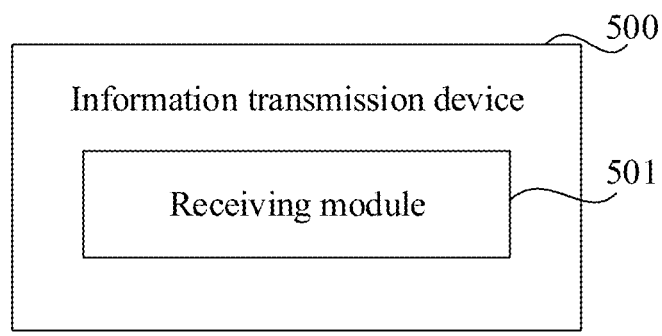
FIG. 5 is a block diagram of an information transmission device according to an embodiment.

FIG. 5 is a block diagram of an information transmission device 500 according to an embodiment. The information transmission device 500 may be arranged in the MME 30 shown in FIG. 1. Referring to FIG. 5, the information transmission device 500 includes a receiving module 501.

The receiving module 501 is configured to receive type information sent by a UAV. The type information is configured to indicate a type of the UAV.

In an embodiment of the present disclosure, the type information is an IMEI of the UAV, and the IMEI includes a TAC configured to indicate the type of the UAV.

In an embodiment of the present disclosure, the receiving module 501 is configured to receive the type information sent by the UAV in a network attachment process.

In an embodiment of the present disclosure, the receiving module 501 is configured to receive the type information sent by the UAV through an identity response in the network attachment process. The identity response is sent by the UAV after an identity request sent by the MME is received.

According to the information transmission device provided in the embodiment of the present disclosure, the MME receives the type information sent by the UAV, the type information being configured to indicate the type of the UAV, and then the MME may control the UAV according to the type of the UAV, so that the flexibility of controlling the UAV can be improved.

Figure 6:
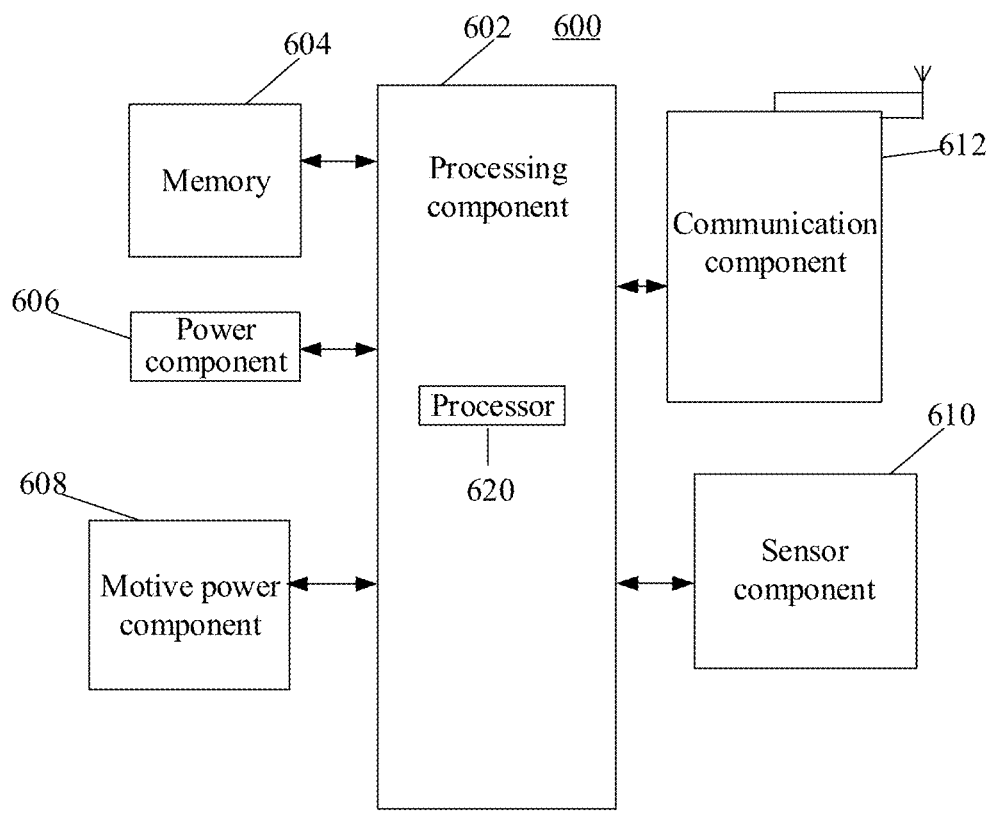
FIG. 6 is a block diagram of an information transmission device according to an embodiment.

FIG. 6 is a block diagram of an information transmission device 600 according to an embodiment. For example, the device 600 may be a UAV.

Referring to FIG. 6, the device 600 may include one or more of the following components: a processing component 602, a memory 604, a power component 606, a motive power component 608, a sensor component 610 and a communication component 612.

The processing component 602 typically controls overall operations of the device 600, such as the operations of data communications, flight height changing, flight direction changing and flight mode switching. The processing component 602 may include one or more processors 620 to execute instructions to perform all or part of the operations in the abovementioned method. Moreover, the processing component 602 may include one or more modules which facilitate interaction between the processing component 602 and the other components. For instance, the processing component 602 may include a sensor module to facilitate interaction between the sensor component 610 and the processing component 602.

The memory 604 is configured to store various types of data to support operations of the device 600. Examples of such data include instructions for any application programs or methods installed in the device 600. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with generation, management and distribution of power for the device 600.

The motive power component 608 may provide motive power for flight of the UAV and may be controlled by the processing component 602 to change a flight height and flight direction, etc., of the UAV.

The sensor component 610 includes one or more sensors configured to provide status assessment in various aspects for the device 600. For example, the sensor component 610 may detect an orientation or acceleration/deceleration of the device 600 and a change in temperature of the device 600. The sensor component 610 may include a proximity sensor configured to detect presence of an object nearby without any physical contact. The sensor component 610 may also include a light sensor, such as a Complementary Metal Oxide Semiconductor (CMOS) or Charge Coupled Device (CCD) image sensor, configured for use in an imaging application. In some embodiments, the sensor component 610 may also include an acceleration sensor, a gyroscope sensor, a magnetic sensor, a pressure sensor or a temperature sensor.

The communication component 612 is configured to facilitate wired or wireless communication between the device 600 and another device. The device 600 may access a communication-standard-based wireless network, such as a Wireless Fidelity (Wi-Fi) network, a 2nd-Generation (2G) or 3rd-Generation (3G) network or a combination thereof. In an embodiment, the communication component 612 receives a broadcast signal or broadcast associated information from an external broadcast management system through a broadcast channel. In an embodiment, the communication component 612 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an embodiment, there is also provided a non-transitory computer-readable storage medium including an instruction, such as the memory 604 including an instruction, and the instruction may be executed by the processor 620 of the device 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an embodiment, there is also provided a non-transitory computer-readable storage medium. An instruction in the storage medium may be executed by a processor of an UAV to enable the UAV to execute the information transmission method provided in the embodiments of the present disclosure.

Figure 7:
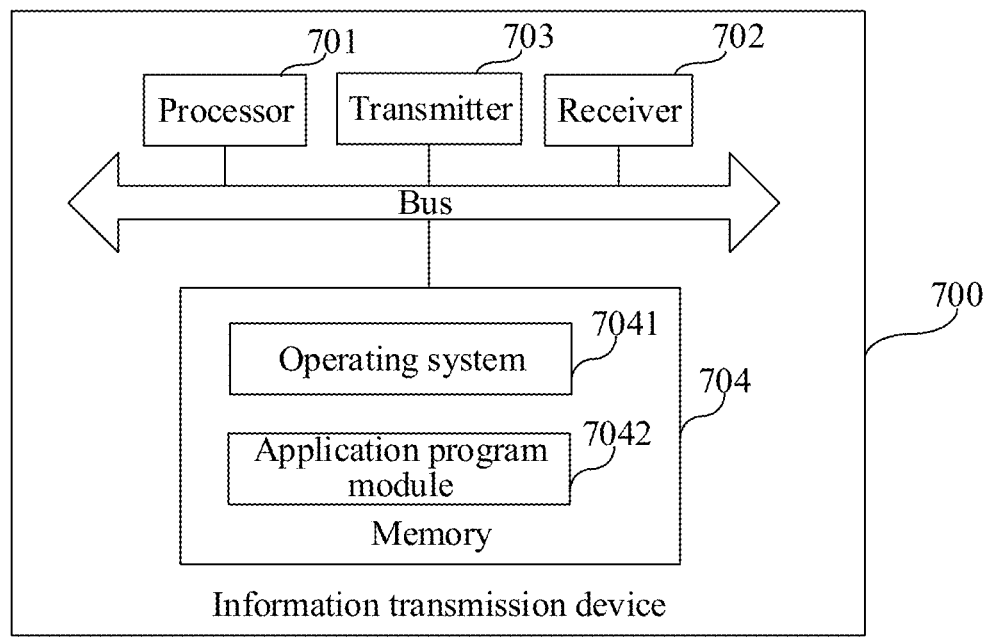
FIG. 7 is a block diagram of an information transmission device according to an embodiment.

FIG. 7 is a block diagram of an information transmission device 700 according to an embodiment. For example, the information transmission device 700 may be an MME. As shown in FIG. 7, the information transmission device 700 may include a processor 701, a receiver 702, a transmitter 703 and a memory 704. The receiver 702, the transmitter 703 and the memory 704 are connected with the processor 701 through a bus respectively.

The processor 701 includes one or more processing cores, and the processor 701 runs a software program and a module to execute the method executed by an MME in the information transmission method provided in the embodiments of the present disclosure. The memory 704 may be configured to store the software program and the module. Specifically, the memory 704 may store an operating system 7041 and an application program module 7042 required by at least one function. The receiver 702 is configured to receive communication data sent by another device, and the transmitter 703 is configured to send communication data to the other device.

Figure 8:
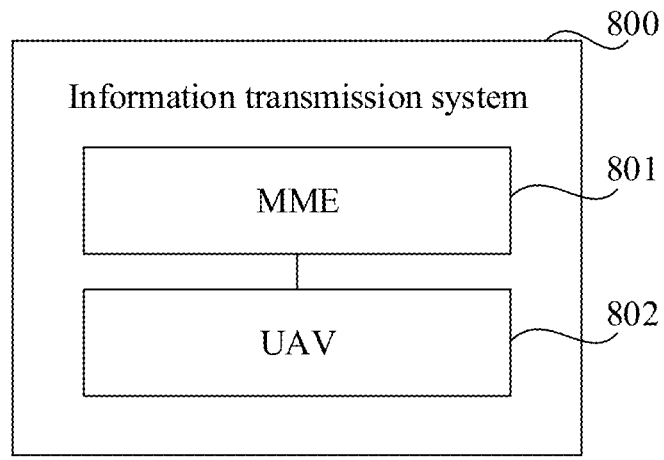
FIG. 8 is a block diagram of an information transmission system according to an embodiment.

FIG. 8 is a block diagram of an information transmission system 800 according to an embodiment. As shown in FIG. 8, the information transmission system 800 includes an MME 801 and a UAV 802.

The MME 801 is configured to execute the information transmission method executed by an MME in the embodiment shown in FIG. 4.

The UAV 802 is configured to execute the information transmission method executed by an UAV in the embodiment shown in FIG. 4.

In an embodiment, there is also provided a computer-readable storage medium. The computer-readable storage medium is a non-volatile computer-readable storage medium. A computer program is stored in the computer-readable storage medium. The stored computer program is executed by a processing component to implement the information transmission method provided in the abovementioned embodiments of the present disclosure.

The embodiments of the present disclosure also provide a computer program product. The computer program product stores an instruction that, when run in a computer, enables the computer to execute the information transmission method provided in the embodiments of the present disclosure.

The embodiments of the present disclosure also provide a chip. The chip includes a programmable logic circuit and/or a program instruction and may run to execute the information transmission method provided in the embodiments of the present disclosure.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An information transmission method, comprising:
receiving, by an unmanned aerial vehicle (UAV), an identity request sent by a mobility management entity (MME) in a network attachment process;
in response to receiving the identity request sent by the MME, sending, by the UAV, an identity response comprising type information to the MME,
wherein the type information indicates a type of the UAV, and a supervision requirement is determined by the MME according to the type of the UAV, to enable the UAV to be controlled by the MME through the supervision requirement, and wherein the supervision requirement comprises alarming or decreasing a flight height, the type information is an International Mobile Equipment Identity (IMEI) of the UAV, the IMEI comprises a Type Allocation Code (TAC) used for indicating the type of the UAV, and the type of the UAV comprises at least one of: a micro UAV, a light UAV, a small UAV, a medium-sized UAV or a large UAV.

2. The method of claim 1, wherein the UAV accesses a cellular network through the network attachment process.

3. The method of claim 1, wherein the UAV implements network attachment under at least one of following three conditions:
implementing network attachment after turned on;
implementing network attachment after returning to a coverage area of a cellular network from a coverage hole of the cellular network; or
implementing network attachment after plugged with a Subscriber Identification Module (SIM) card.

4. The method of claim 1, wherein a correspondence between the TAC and the type of the UAV satisfies: TAC1 corresponding to the micro UAV, TAC2 corresponding to the light UAV, TAC3 corresponding to the small UAV, TAC4 corresponding to the medium-sized UAV, and TAC5 corresponding to the large UAV.

5. An information transmission method, comprising:
sending, by a mobility management entity (MME), an identity request to an unmanned aerial vehicle (UAV) in a network attachment process;
receiving, by the MME, an identity response comprising type information sent by the UAV, wherein the type information indicates a type of the UAV;
determining, by the MME, a supervision requirement according to the type of the UAV; and
controlling, by the MME, the UAV through the supervision requirement, wherein the supervision requirement comprises alarming or decreasing a flight height, the type information is an International Mobile Equipment Identity (IMEI) of the UAV, the IMEI comprises a Type Allocation Code (TAC) used for indicating the type of the UAV, and the type of UAV comprises at least one of: a micro UAV, a light UAV, a small UAV, a medium-sized UAV or a large UAV.

6. The method of claim 5, wherein the UAV accesses a cellular network through the network attachment process.

7. The method of claim 5, wherein the UAV implements network attachment under at least one of following three conditions:
the UAV implements network attachment after turned on;
the UAV implements network attachment after returning to a coverage area of a cellular network from a coverage hole of the cellular network; or
the UAV implements network attachment after plugged with a Subscriber Identification Module (SIM) card.

8. The method of claim 5, wherein a correspondence between the TAC and the type of the UAV satisfies: TAC1 corresponding to the micro UAV, TAC2 corresponding to the light UAV, TAC3 corresponding to the small UAV, TAC4 corresponding to the medium-sized UAV, and TAC5 corresponding to the large UAV.

9. An unmanned aerial vehicle (UAV), comprising:
a processor; and
a memory configured to store an instruction executable by the processor,
wherein the processor is configured to:
receive an identity request sent by a mobility management entity (MME) in a network attachment process;
in response to receiving the identity request sent by the MME, send an identity response comprising type information to the MME,
wherein the type information indicates a type of the UAV, and a supervision requirement is determined by the MME according to the type of the UAV, to enable the UAV to be controlled by the MME through the supervision requirement, and wherein the supervision requirement comprises alarming or decreasing a flight height, the type information is an International Mobile Equipment Identity (IMEI) of the UAV, the IMEI comprises a Type Allocation Code (TAC) used for indicating the type of the UAV, and the type of the UAV comprises at least one of: a micro UAV, a light UAV, a small UAV, a medium-sized UAV or a large UAV.

10. A mobility management entity (MME) implementing the method of claim 5, comprising:
a processor; and
a memory configured to store an instruction executable by the processor,
wherein the processor is configured to:
send an identity request to an unmanned aerial vehicle (UAV) in a network attachment process;
receive an identity response comprising type information sent by the UAV, wherein the type information indicates a type of the UAV;
determine a supervision requirement according to the type of the UAV; and
control the UAV through the supervision requirement, wherein the supervision requirement comprises alarming or decreasing a flight height, the type information is an International Mobile Equipment Identity (IMEI) of the UAV, the IMEI comprises a Type Allocation Code (TAC) used for indicating the type of the UAV, and the type of UAV comprises at least one of: a micro UAV, a light UAV, a small UAV, a medium-sized UAV or a large UAV.

* * * * *